Nov. 25, 1924.  1,516,774
J. S. LANCASTER
APPARATUS FOR COATING OR IMPREGNATING ROAD STONE OR OTHER MATERIAL
Filed Dec. 4, 1923  7 Sheets-Sheet 2

Inventor:
John Stuart Lancaster

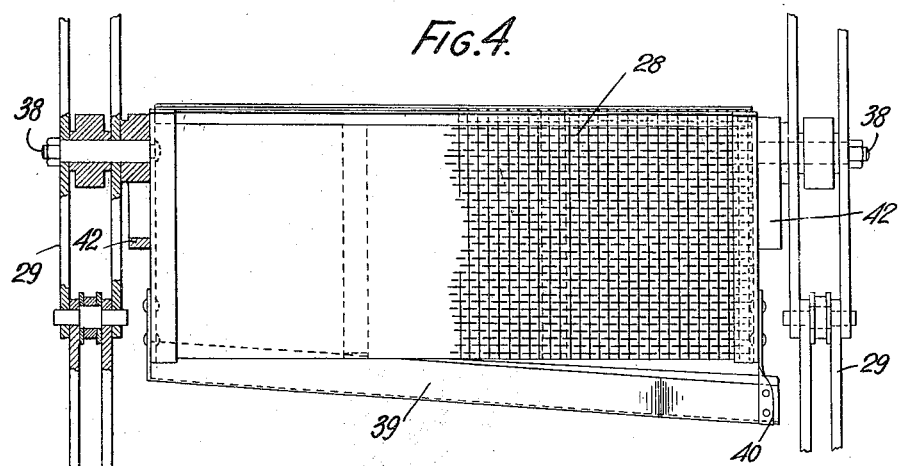
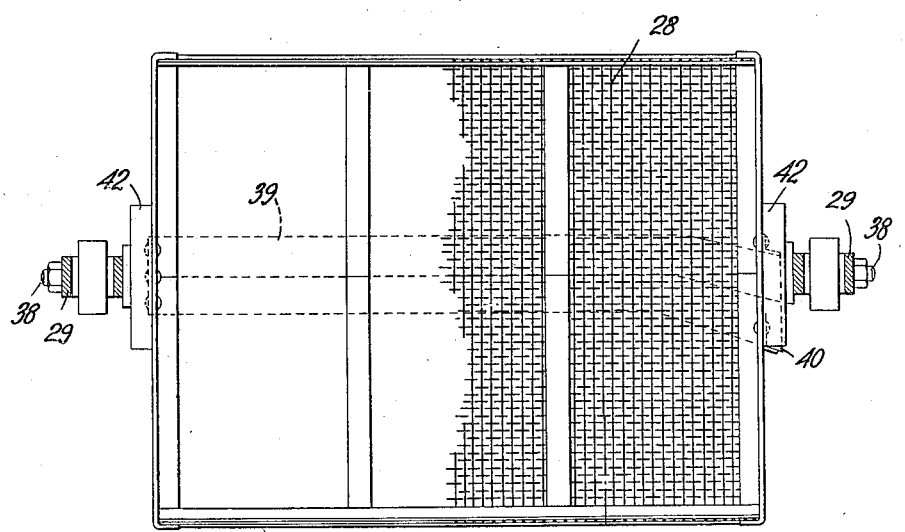
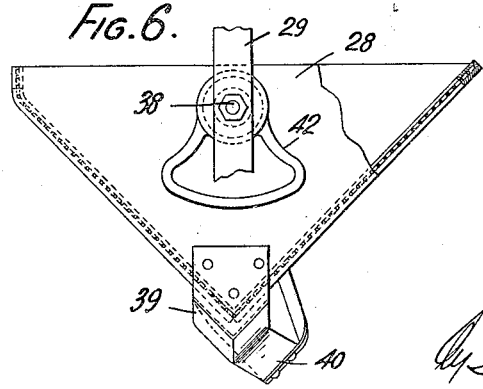

Nov. 25, 1924.
J. S. LANCASTER
1,516,774
APPARATUS FOR COATING OR IMPREGNATING ROAD STONE OR OTHER MATERIAL
Filed Dec. 4, 1923  7 Sheets-Sheet 5
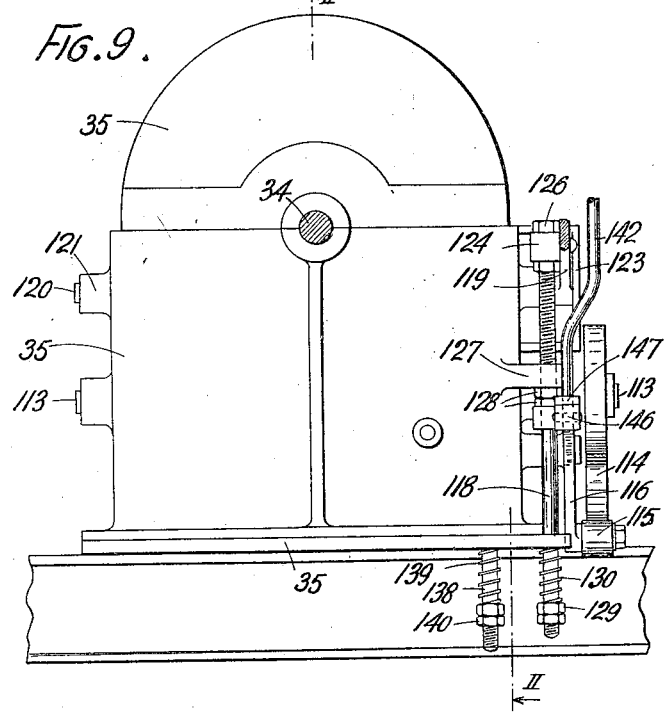
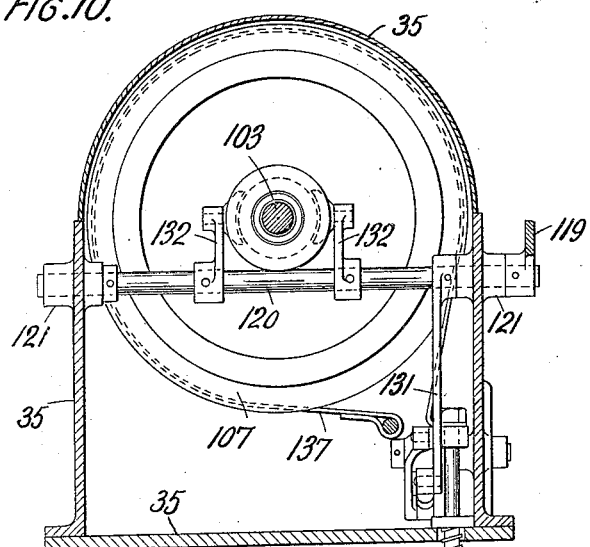

Nov. 25, 1924.
J. S. LANCASTER
1,516,774
APPARATUS FOR COATING OR IMPREGNATING ROAD STONE OR OTHER MATERIAL
Filed Dec. 4, 1923      7 Sheets-Sheet 6
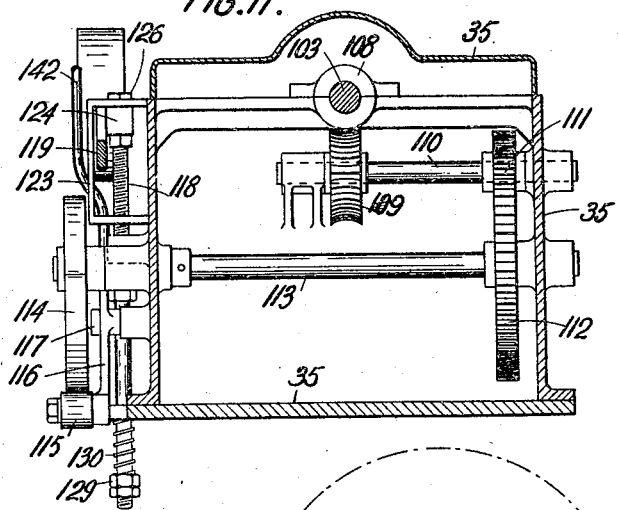
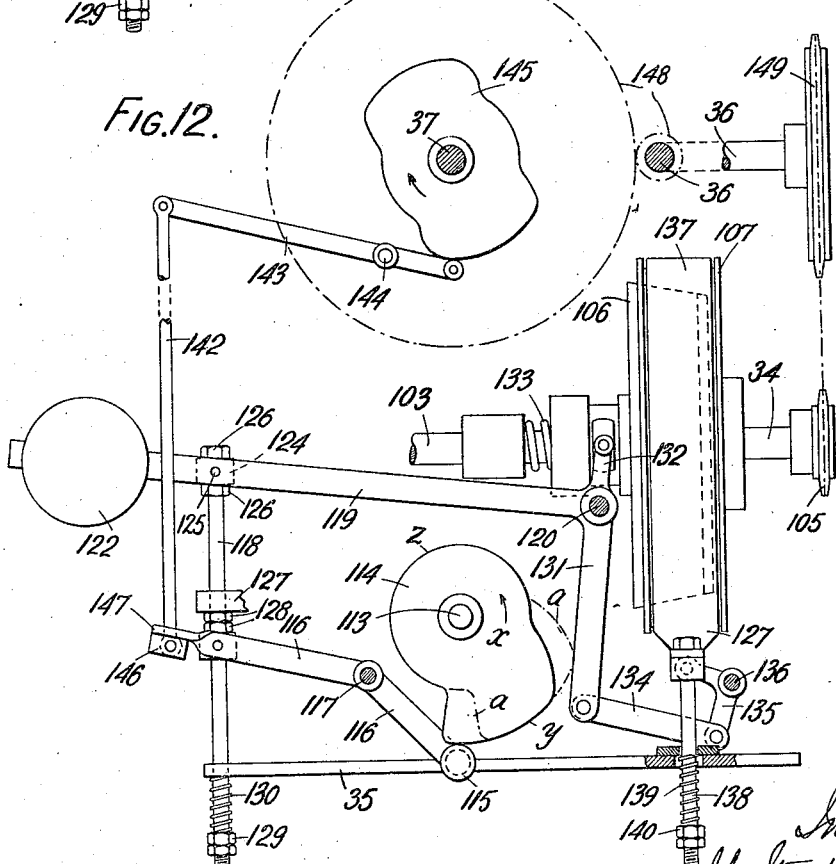

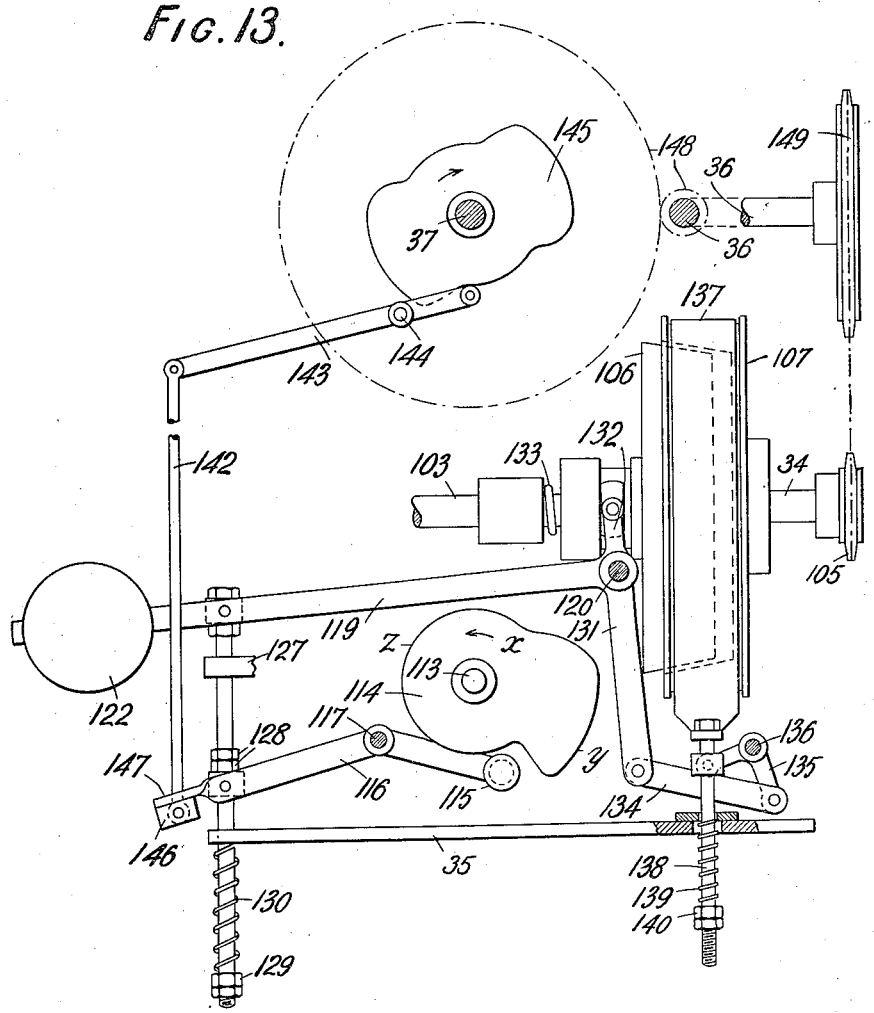

Patented Nov. 25, 1924.

1,516,774

UNITED STATES PATENT OFFICE.

JOHN STUART LANCASTER, OF WARWICK, ENGLAND, ASSIGNOR OF ONE-HALF TO JOHN FAULDER BURN, OF LONDON, ENGLAND.

APPARATUS FOR COATING OR IMPREGNATING ROAD STONE OR OTHER MATERIAL.

Application filed December 4, 1923. Serial No. 678,546.

*To all whom it may concern:*

Be it known that I, JOHN STUART LAN-CASTER, of 106 Emscote Road, Warwick, in the county of Warwick, England, a subject of the King of Great Britain and Ireland, have invented a new and Improved Apparatus for Coating or Impregnating Road Stone or Other Material (for which I have filed applications in Great Britain, No. 33,-239, filed the 5th December, 1922; No. 5,602, filed the 26th February, 1923; and No. 22,290, filed the 4th September, 1923), of which the following is a specification.

The present invention relates to a process and apparatus for coating or impregnating road stone or other material. This invention includes also a container for material so designed and constructed as to enable the coating or impregnating liquor, which is in a tank, to gain quick access to the contents, when the latter, with the container, are immersed in the liquid medium, also to cause the superfluous liquor to escape freely from the container and its contents when lifted out of the medium, the escaping liquor draining externally to the extreme bottom of the container before falling free. The invention also includes means for causing intermittent periods of rest to occur in the travel of the material to be coated, for the purpose hereinafter explained. For convenience of description the material to be treated will be assumed to be stone, previously crushed and sized or graded for the object in view. It will also be assumed that the medium with which the material is to be treated is tar or bitumen (referred to hereinafter as tar) which must be applied whilst hot for the purpose of producing a good road-making composition.

Reference will hereinafter be made to the accompanying drawings and to the reference numerals marked thereon.

Fig. 4 is a still more enlarged view showing in side elevation one particular form of the containers or baskets of the conveyor.

Fig. 5 is a plan and Fig. 6 an end view of Fig. 4.

Fig. 9 is an end elevation.

Fig. 10 is a section on line IV—IV of Fig. 8.

Fig. 11 is a section on line V—V of Fig. 8 looking in the direction of the arrows in both cases.

Figs. 12 and 13 are diagrammatic side views showing the coupled and uncoupled positions respectively together with the control cams as will be further explained.

The same reference numerals denote the same or corresponding parts in the various figures.

Figure 1:
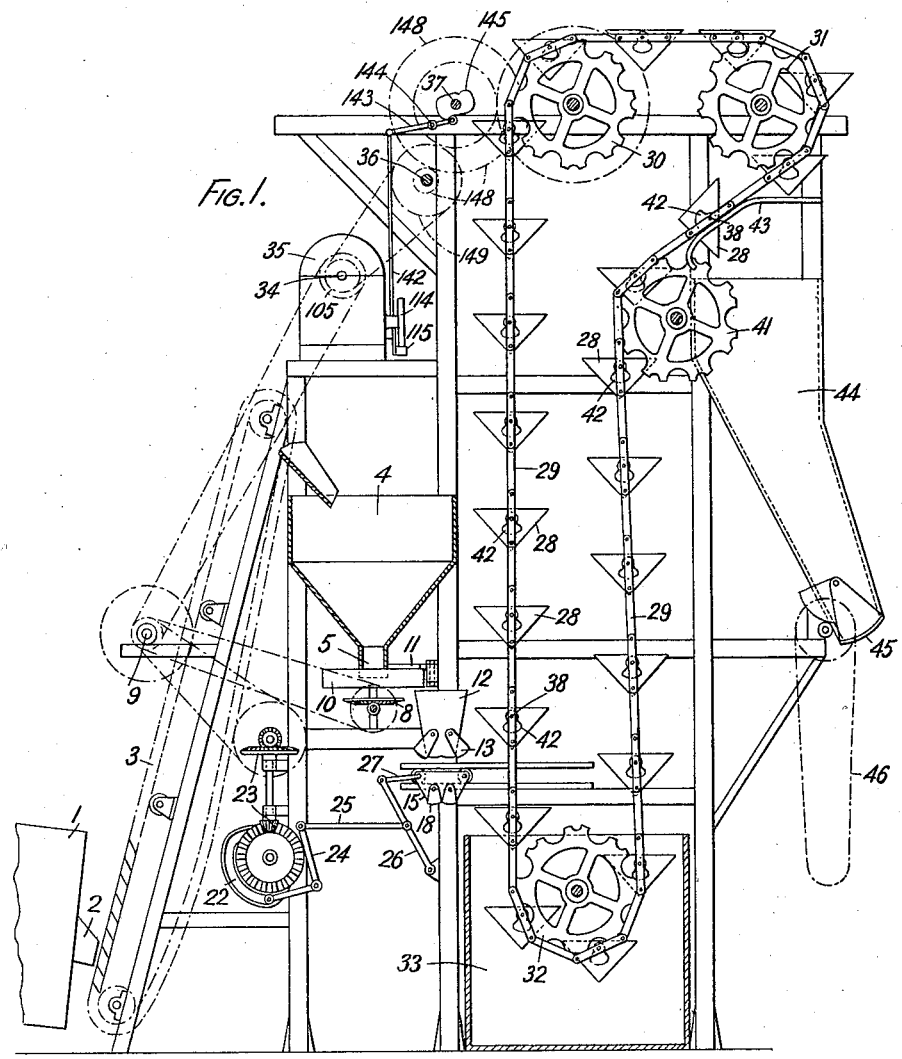
Fig. 1 is a diagrammatic side elevation of the tarring portion of my plant.

The stone is fed into one end of an axially rotatable tube which is heated and fitted with baffle plates to allow the stone to absorb a maximum amount of heat before it is discharged at the further end 1 of the tube which is shown in Fig. 1. The action of the stone travelling down the tube 1 is continuous, and an even stream is discharged.

The heat is introduced at the delivery end of the tube 1, pulverulent fuel, petroleum residue or gas forming the heat agent. The incline, if any, of the tube, together with its particular length and diameter, creates a current of hot air travelling through the same which dries the stone sufficiently and equally.

Figure 2:
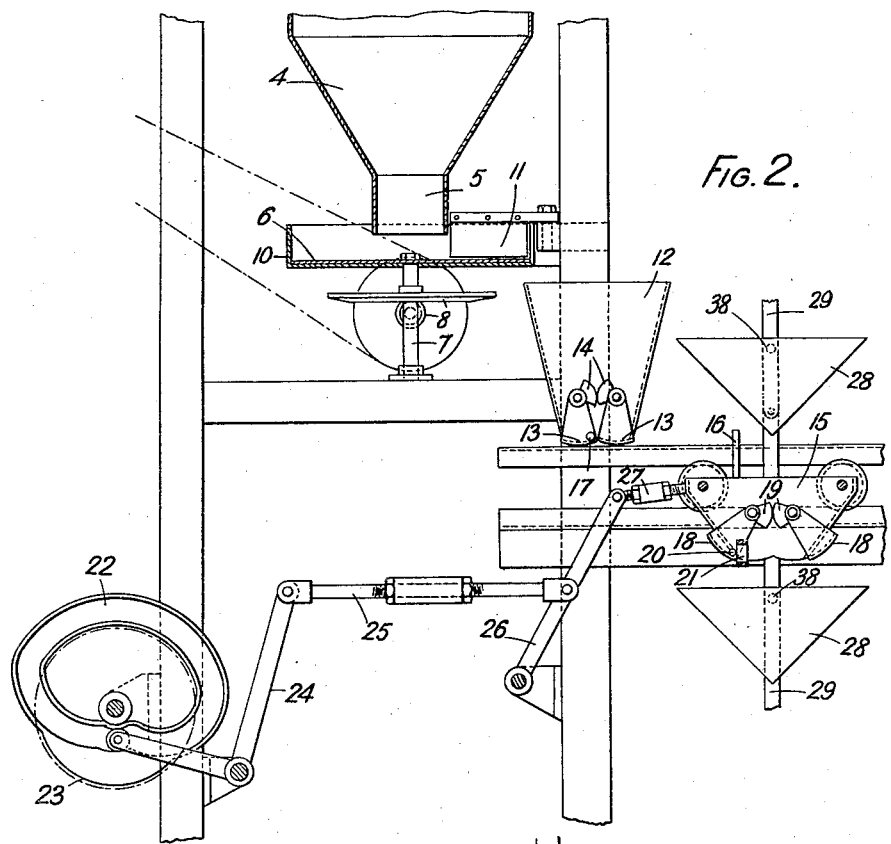
Fig. 2 is an enlarged elevation of a portion of Fig. 1 showing the supply hopper in its delivering position.
Figure 3:
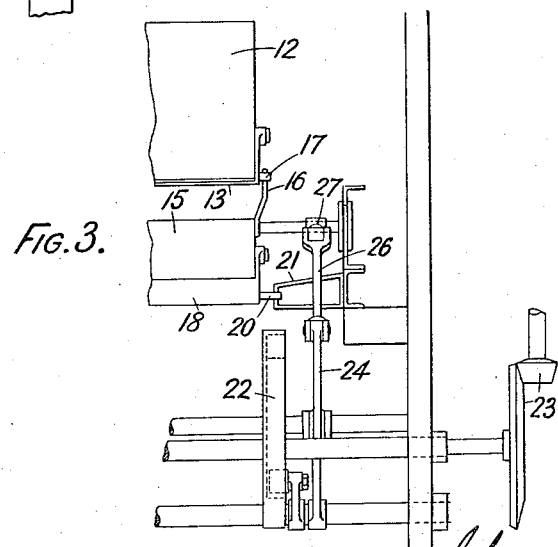
Fig. 3 is a view taken at right angles to Fig. 2 showing only one side of the apparatus.

A discharge chute 2 is fixed at a convenient point at the delivery end of the tube to receive and discharge the stream of dried and heated stone. An elevator 3 of suitable design and capacity takes the discharge from this chute and, in turn, discharges into an arresting hopper 4 of suitable capacity to suit the material being treated, and to arrest it for a definite time limit in order to cool down or dry off before proceeding to the next operation. The hopper 4 is suitably shaped to allow the stone to fall by gravity from the orifice 5 controlled by a suitable device for retarding or accelerating the flow of stone as follows. Directly under 5 is introduced a rotary table 6 (Fig. 2) the speed of which is suitable for withdrawing the required quantity from the hopper 4.

The table 6 is conveniently mounted on a spindle 7 which receives motion from bevel gears 8 driven from a main or lay shaft 9 (Fig. 1). A stationary drum with flange 10 surrounds the table 6 and prevents any stone being discharged except through an opening in the said flange, where an adjustable blade or deflector 11 is fixed for diverting and causing the stone to flow in a stream into a fixed hopper 12. This hopper 12 has an opening gate at the bottom which consists of two doors 13 geared or connected together by toothed quadrants 14 (Fig. 1) a movement given to one being thus transmitted to the other. These doors 13 are opened and closed automatically by the travel of a movable hopper 15 adapted to run to and fro between rails 47, 48 for which purpose it may have runners 49 to reduce friction. The hopper 15 opens the hopper 12 by means of a finger 16 which it carries striking against a stud 17, projecting from the furthermost door of hopper 12. This allows the material contained therein to fall into hopper 15. After resting for a short period of time in this position, it moves in the reverse direction allowing the doors 13 to close, and, at the same time, takes the charge and carries it a definitely prearranged distance before opening in a similar manner to the hopper 12, that is to say, there are doors 18 at the bottom of hopper 15 which are intergeared by toothed quadrants 19, and one of the doors 18 bears a stud 20 which strikes against a fixed stop 21 just as the hopper 15 carrying it approaches the completion of its journey. The material in the hopper 15 is thereupon discharged downwards. The movement is imparted to this hopper 15 by cams 22, which are rotated through two bevel gears 23 driven from the shaft 9 previously mentioned, the motion being transmitted from the cam 22 through the bell-crank levers 24 connected by links 25 to levers 26 and links 27. The time and distance periods are controllable by the design and speed of the cams 22. The stone is deposited in a container or basket 28, the hopper 15 is withdrawn by cams 22 and the operation repeated. The container 28 is one of a series suspended by a double endless chain or chains 29 passing over upper sprockets 30, 31 and under bottom sprockets 32 the latter being located within a dipping tank 33 containing tar. While the hopper 15 is travelling the container 28 which has just received its charge moves into the dipping tank 33, and the following container which is empty descends to the exact position recently occupied by the former.

The conveyor, consisting of the containers 28 on the chains 29, is worked from the main shaft 9 by a reduction gear comprising a shaft 34 within a gear box 35, transmitting motion to another shaft 36, which through further gearing (needless to detail) drives a shaft 37 carrying a gear wheel which engages with a corresponding gear wheel on the shaft carrying the sprocket 30.

The stone in the successive containers or baskets 28 is coated with tar by means of immersion in the tank 33, the tar therein being kept at a certain temperature. The temperature is a essential part of the process as the regulation of the temperature controls the amount of tar taken up by the stone during its immersion, i. e. a high temperature—lower quantity of tar: low temperature—high quantity of tar, and uniform quantities of tar according to intermediate temperatures. The dipping must be controlled, and it is necessary to allow the stone to remain for a certain space of time fully immersed.

The containers 28 consist of wire gauze or perforated steel buckets or skips, each container being carried on pivots or trunnions 38. These pivots are connected to steel links of suitable lengths (constituting the chain 29) according to the capacity and size of plant. The containers 28 are designed to hang vertically on their pivots or trunnions 38, irrespective of the angle of the links of the chain 29. The empty containers 28 travel down empty to a convenient position under the discharge hopper 15 and automatically come to rest each in turn. The speed of the travel between each stop should be regulated, as this speed, together with the time of the stop, controls the duration of the dip and of the subsequent draining, also the time of the feeding of the stone into each container and the rate of the discharge. The time of the draining in order to extract the superfluous tar after dipping, is controlled by means of a calculated height through which these containers travel vertically, this height being based on the time required for the extraction of the tar, considering the moving and stopping times.

Each container 28 is a vessel, preferably open, having perforations in its bottom end or ends, or it may be made wholly or partly of basket work, that is, woven from wire or other material, or otherwise designed to enable it to retain solids of a certain minimum gauge, but permit liquids to enter and escape freely.

The shape of the containers is a matter of prime importance to the working of the invention. It is V shape in section having triangular ends, the flat sides of the V being set at a particular angle to one another according to the viscosity of the tar, or such like liquid which is being used, whereby the said angle is the maximum which is possible without allowing the excess liquor to fall freely away from the sides, but will rather cause the liquor to exude and flow down (whilst adhering to) the undersurface of the inclined sides until it reaches the inverted apex, where it will collect and drip off. An external gutter 39 (Figs. 4, 5 and 6) is provided under the bottom or apex of the container to catch these drippings, and such gutter is inclined from one end of the container to the other, so that the liquor which drips into such gutter will flow by gravity to one end (or both ends) thereof and may fall back into the liquor tank 33 or be removed or diverted as may be desired.

This arrangement prevents the dripping of the tar from one container to the next container immediately below it.

The container may be constructed of steel or other material, and the perforations may be of any type, including areas filled with strong wire mesh or otherwise.

The container by virtue of its shape as above described, presents a large upper surface to the tar, thus securing rapidity of access to the contents and reducing the time required for draining, inasmuch as a deeper vessel would require a longer time for the superfluous tar to flow downwards and escape.

A discharge spout 40 is added to the gutter 39, such spout having a direction inclined to the gutter for the purpose of preventing any tar which might (owing to the temperature being lower) have remained in the gutters from being discharged with the finished contents when the containers are tipped, the spout acting as a trap for the liquor, and avoiding waste of liquor.

In order to produce the necessary alterations of motion and rest to the containers 28, the gear box 35 is designed to receive a continuous drive and to give out an intermittent drive. The details of such an arrangement are shown clearly in Figs. 7 to 13.

The mechanism is mostly enclosed within the gear box 35 through which run two colinear shafts 103 and 34 coupled through a clutch which is put into and out of action at certain regular intervals as required.

The shaft 103 is the driving shaft and 34 the driven shaft. The former is rotated by a belt or chain gear, whilst the latter carries a chain wheel 105. A clutch is provided at the point where the shafts 103 and 34 are divided, the shaft 103 carrying the cone 106 fast upon it, and the shaft 34, the cone drum 107. A worm 108 is fixed to shaft 103 which operates a worm wheel 109 which rotates a worm wheel shaft 110, to which is fixed a spur pinion 111 which gears with a spur wheel 112. The latter drives the shaft 113 carrying the "starting" cam 114, the edge of which works upon a roller 115 mounted on one end of a lever 116 hinged to a fixed point 117. The lever 116 is continued beyond the hinge 117, and is there adapted to support a vertical rod 118 for lifting up a weighted arm 119 for a purpose which will be explained herein.

Figure 8:
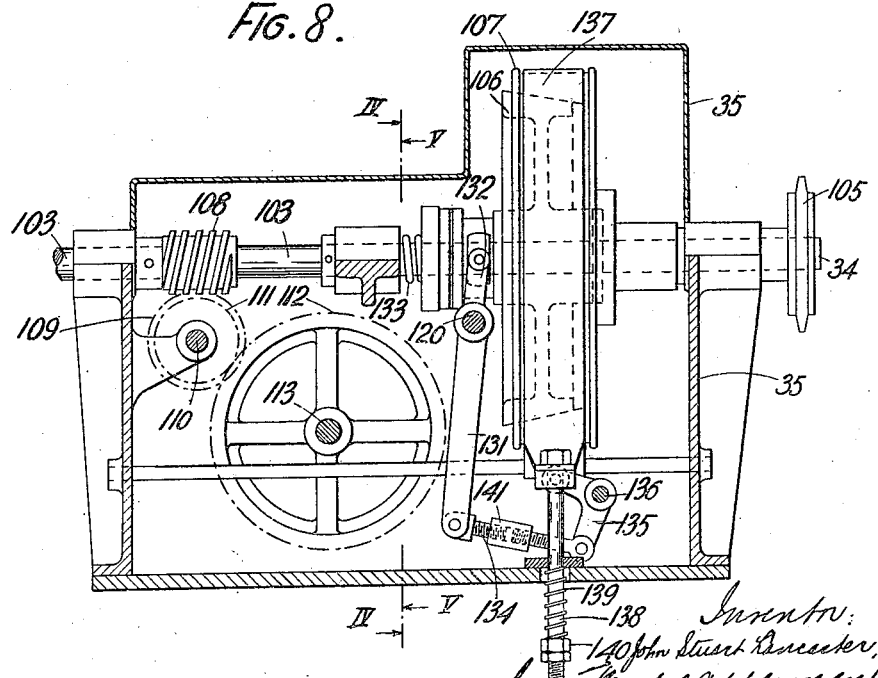
Fig. 8 is a section on the line II—II of Fig. 9 looking in the direction of the arrows.

The arm 119 is made fast at one end upon a spindle 120, which is journalled in bearings 121 in the sides of the box 35 at right angles to the shaft 103. The opposite end of the arm 119 carries a weight 122, and the arm 119 is allowed a certain amount of movement in a guide 123. The rod 118 is hinged at its upper end to the arm 119 such as by a collar 124 upon the rod bearing a pin 125 entering a slot in the arm 119 and supporting it. The collar 124 is kept in position by nuts 126 at top and bottom by means of which its height may be adjusted, the rod 118 being screw-threaded for this purpose. The rod 118 also carries adjustable nuts 128 for connecting with the lever 116 and it is guided through a bracket 127 upon box 35 and through another bracket or extension of the base of said box below which the rod protrudes a sufficient distance to give it the necessary vertical play. It may be fitted with a pair of adjustment nuts 129 screwed at its bottom extremity and a compression spring 130 surrounding it between the nut 129 and the bottom of the box 35. The spindle 120 carries also an arm 131 practically at a right angle to the arm 119, fast upon the same spindle. The latter also carries fork members 132 keyed thereon, which, in a well known manner, are adapted to withdraw the cone 106 out of engagement with the cone drum 107, against the counter pressure of a spring 133 which returns the cone 106 into clutching engagement with the cone drum 107, when free to do so. The arm 131 is connected by a link 134 with one arm of a bell-crank lever 135, upon a stationary pivot 136, the other arm of said crank being connected to a band-brake 137 upon the drum 107. A brake rod 138 is pivotally connected to the same member of the lever 135 which is connected to the band-brake 137, and the rod 138, extends through the base of box 35 below which it is furnished with a brake actuating spring 139 located between a pair of lock nuts 140 and the bottom of box 35. The arrangement is such that when the fork members 132 force the clutch members 106, 107 apart, the arm 131 simultaneously enables the band-brake 137 to grip upon the drum 107 through the medium of this spring 139. The link 134 may be divided as shown in Fig. 8 and the ends be threaded oppositely and connected by a correspondingly threaded sleeve 141, by means of which the band-brake 137 can be adjusted. The working of the apparatus as so far described may now be explained.

Figure 7:
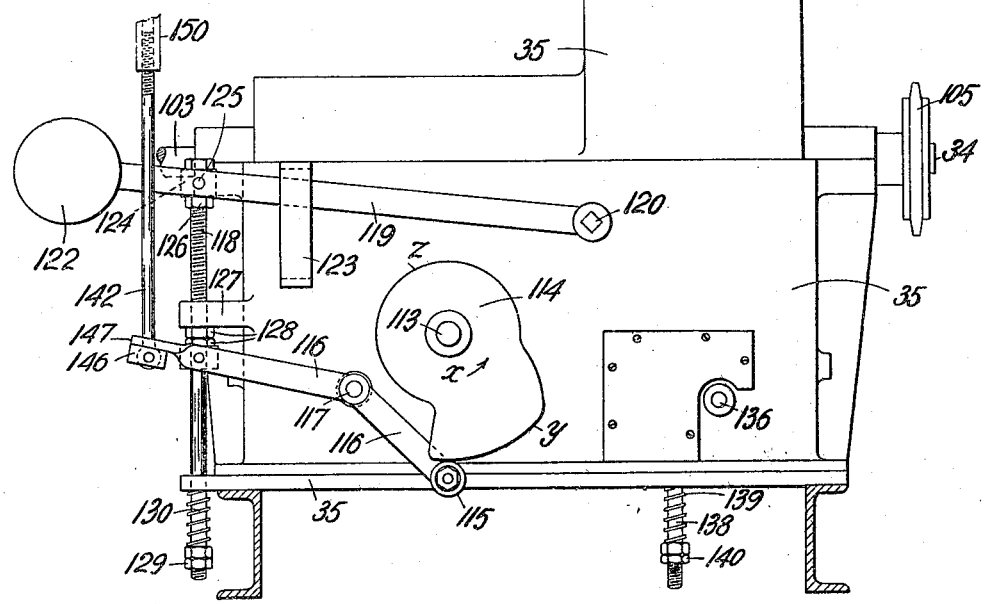
Fig. 7 is an external side elevation of the gear box which converts continuous into intermittent rotary motion.

Assuming the relative positions are those illustrated in Figs. 7, 8 and 12 the clutch composed of the cone 106 and drum 107 is in closed position and the shaft 103 is producing a direct drive upon the shaft 34. (For some purposes this drive could be transmitted through gearing, differential or otherwise, according to circumstances). In the present case, the coupling is direct from the shaft 103 to the shaft 34. The worm 108 is all the while causing the shaft 113 carrying cam 114 to rotate in the direction of arrow $x$ in Figs. 7, 12 and 13 through the medium of the gears 111 and 112.

The cam 114 has a raised portion $y$ standing considerably higher than the main concentric portion $z$ and it is the raised portion $y$ which has the important function of holding the weight 122 in raised position through the medium of lever 116 and rod 118, as previously explained the spring 130 acts as a buffer against a too sudden upward movement of the weighted arm 119. In due course the surface $y$ rotates free from the roller 115. Hence the weight 122 is no longer supported by this part of the cam but the weight falls causing the spindle 120 to rotate slightly and in doing so compelling the clutch members to disengage, the weight 122 being of sufficient mass to overcome the pressure of the spring 133. At the same time the arm 131 swings slightly, rocking the crank lever 135 and causing the band-brake 137 under the influence of the brake spring 139 to grip the drum 107 and arrest the motion of the driven shaft 34. The driven piece of machinery can be stopped within limits which can be determined by the strength of the brake spring 139 in proportion to the amount of force rotating in the driven mass.

The gear box is applicable amongst other purposes for working a conveyor chain through the chain wheel 105, and in cases where a bucket conveyor is required to stop at short regular intervals while the main shaft continues running it is sometimes essential to assume that the buckets always come to rest in exactly the same position under a chute or hopper, for receiving the contents. Exactness of position is more essential in these cases than exactness of the time of rest, as a few moments more or less is immaterial. This is essentially so when the charge enters the buckets one by one, in a moment or two of time, and the buckets are required to remain stationary for a somewhat longer time in order that their contents (e. g. stones) may become thoroughly impregnated with material (e. g. tar) contained in a tank into which the conveyor dips. The intervals of rest are also useful for draining the material afterwards, it being assumed that the buckets are porous.

In a development, means are provided for co-ordinating the timing of the shaft 34 with the shaft 103, whereby the shaft 34 shall come to rest at precisely the desired successive positions notwithstanding any loss by slipping, stretching or wearing of any parts, the latter conditions being reflected only in an insignificant diminution of the period of rest. In order to ensure that the clutch members 106 107 shall disengage and the shaft 34 come to rest at the proper instant of time the weighted arm 119 is prevented from falling prematurely, even though the raised surface $y$ has rotated beyond the roller 115. The rod 118 is continued to be held up by a rod 142 suspended from a lever 143 (Figs. 12 and 13) pivoted at 144 and having a roller at the other end upon which bears the edge of a cam 145 as explained further. The lower end of the rod 142 carries a head 146 which prevents it from being drawn through an eye 147 which is provided in an extension of the lever 116. The cam 145 is mounted on a shaft 37 which is driven from another shaft 36 through reduction gears 148, the shaft 36 carrying a chain wheel 149 which rotates synchronously with the chain wheel 105, both being engaged by the same chain. The cam 145 allows the weight 122 to fall therefore only at certain regular intervals regardless of the discontinuance of the cam 114 to support said weight. To illustrate this, it will be seen in Figure 12 that after the cam 114 has advanced to a position indicated by the dotted lines $a, a$ the cam 145 will still hold up the weighted arm 119 and allow it to fall only at the exact moment desired according to a particular position of the conveyor buckets. The rod 142 may have a regulating adjustment 150 (Fig. 7) for controlling the lift of the cam 145.

The discharge is controlled at a desired point, the links 29 being passed through any suitable angle by means of idler sprockets 41, which, in turn, also allow adjustment of the links as required. The containers are now tipped to the required angle on their trunnions 38. This tipping is controlled by a trip of suitable design, consisting of cams 42 on the ends of the containers which are brought into contact with catch bars 43, as shown in Fig. 1 where the cam 42 on the container immediately above the idler sprockets 41 is in the act of tipping the container, and delivering the contents into a hopper 44 of any desired capacity. The bar 43 holds the container in the discharged position during the space of time that the chain is at rest, so ensuring a perfect emptying of material. When the chain travels on, after this stop, the container swings back to its original vertical position, empty. The hopper 44 is fitted with a chute which can be closed at will by a door 45 worked by a chain 46 or otherwise.

The control of the temperature of the tar tank being essential to the success of my process, together with the control of the heating of the stone, a suitable burner for the use of pulverulent fuel, petroleum residue or gas, steam coils or any approved heating is introduced under or in the tank 33.

The tar tank can be fed automatically by means of pumps if required, and a constant level maintained.

The plant is designed so that it can be made portable, semi-portable or fixed, as may be desired.

The manufacture is continuous and the control of the movements so well adjusted that we are confident of being able to guarantee a maximum output with the expenditure of a certain horse power. It may be pointed out further that the resting hopper 4 has the peculiar advantage of enabling the material to cool while it rests therein. This permits of a fiercer heat than usual to be used in the drying tube 1, thereby ensuring that the material itself becomes perfectly dry. Thus the period of rest in the hopper avoids the necessity of tarring the material at excessively high temperature.

I claim—

1. Apparatus for coating or impregnating road stone or other material, comprising a hopper into which the dried and heated material is fed, an endless series of perforated containers, means for transferring the material thereto from the hopper, a tank containing tar or other liquor into which the series of containers dips, means for causing the series to travel and the containers to be successively and completely immersed in the liquor and allow the latter to drain off while rising therefrom, and means for discharging the finished material from the containers.

2. Apparatus for coating or impregnating road stone or other material, comprising an endless series of perforated containers, a receiving hopper into which is fed the material to be treated, means for transferring material therefrom to a second fixed hopper, a movable reciprocatory hopper for carrying the material from said second hopper to said perforated containers, means for actuating said movable hopper whereby the bottom of the latter remains closed while it is receiving the charge from the second hopper (the bottom of the latter being then open) and opened when brought into position for discharging into one of the containers, means being provided for synchronizing the closing of the bottom of the second hopper with the motion of the movable hopper, a tank containing tar or other liquor into which the series of containers dips, means for causing the series to travel and the containers to be successively and completely immersed in the liquor and allow the latter to drain off while rising therefrom, and means for discharging the finished material from the containers.

3. Apparatus for coating or impregnating road stone or other material, comprising an endless series of perforated containers, a receiving hopper into which is fed the material to be treated, a second fixed hopper, a rotary table below the orifice of the first hopper, a stationary flange around the latter, a deflecting blade for guiding the material through an opening in said flange into the second hopper, a movable reciprocatory hopper to said perforated containers, means for actuating said movable hopper whereby the bottom of the latter remains closed while it is receiving the charge from the second hopper (the bottom of the latter being then open) and opened when brought into position for discharging into one of the containers, means being provided for synchronizing the closing of the bottom of the second hopper with the motion of the movable hopper, a tank containing tar or other liquor into which the series of containers dips, means for causing the series to travel and the containers to be successively and completely immersed in the liquor and allow the latter to drain off while rising therefrom, and means for discharging the finished material from the containers.

4. Apparatus for coating or impregnating road stone or other material, comprising an endless series of perforated containers, each one designed to hang vertically on pivots or trunnions, and being of V-shape with gutters thereon for receiving and guiding the escaping liquor to the ends so preventing it from dripping upon the containers beneath, also a receiving hopper into which is fed the material to be treated, means for transferring material therefrom to a second fixed hopper, a movable reciprocatory hopper for carrying the material from said second hopper to said perforated containers, means for actuating said movable hopper whereby the bottom of the latter remains closed while it is receiving the charge from the second hopper (the bottom of the latter being then open) and opened when brought into position for discharging into one of the containers, means being provided for synchronizing the closing of the bottom of the second hopper with the motion of the movable hopper, a tank containing tar or other liquor into which the series of containers dips, means for causing the series to travel and the containers to be successively and completely immersed in the liquor and allow the latter to drain off while rising therefrom, and means for discharging the finished material from the containers.

5. Apparatus for coating or impregnating road stone or other material, comprising a hopper into which the dried and heated material is fed, an endless series of perforated containers, means for transferring the material thereto from the hopper, a tank containing tar or other liquor into which the series of containers dips, means for causing the series to travel and the containers to be successively and completely immersed in the liquor and allow the latter to drain off while rising therefrom, and means for discharging the finished material from the containers together with means for imparting an intermittent travelling motion to the said series of containers.

6. Apparatus for coating or impregnating road stone or other material, comprising a hopper into which the dried and heated material is fed, an endless series of perforated containers, means for transferring the material thereto from the hopper, a tank containing tar or other liquor into which the series of containers dips, means for causing the series to travel and the containers to be successively and completely immersed in the liquor and allow the latter to drain off while rising therefrom, and means for discharging the finished material from the containers combined with an intermittent gear box composed of a continuously rotary driving member and an intermittently rotary driving member, there being a clutch between them and means for alternately coupling and uncoupling said members through the medium of said clutch, also means for driving the said endless series of containers from said intermittently driven member.

7. Apparatus for coating or impregnating road stone or other material, comprising a hopper into which the dried and heated material is fed, and endless series of perforated containers, means for transferring the material thereto from the hopper, a tank containing tar or other liquor into which the series of containers dips, means for causing the series to travel and the containers to be successively and completely immersed in liquor and allow the latter to drain off while rising therefrom, and means for discharging the finished material from the containers combined with an intermittent gear box composed of a continuously rotary driving member and an intermittently rotary driven member, there being a clutch between them and means for alternately coupling and uncoupling said members through the medium of said clutch, means for driving the said endless series of containers from the said intermittently driven member, together with means for automatically putting a brake upon the driven member each time that it is disconnected from the driving member.

8. Apparatus for coating or impregnating road stone or other material, comprising a hopper into which the dried and heated material is fed, an endless series of perforated containers, means for transferring the material thereto from the hopper, a tank containing tar or other liquor into which the series of containers dips, means for causing the series to travel and the containers to be successively and completely immersed in the liquor and allow the latter to drain off while rising therefrom, and means for discharging the finished material from the containers combined with an intermittent gear box composed of a continuously rotary driving member and an intermittently rotary driven member, there being a clutch between them and means for alternately coupling and uncoupling said members through the medium of said clutch, said means comprising a weighted arm hinged at one end, a rotary cam adapted to support same during part of its rotation, and means connecting said arm to said clutch whereby the latter is automatically operated.

9. Apparatus for coating or impregnating road stone or other material, comprising a hopper into which the dried and heated material is fed, an endless series of perforated containers, means for transferring the material thereto from the hopper, a tank containing tar or other liquor into which the series of containers dips, means for causing the series to travel and the containers to be successively and completely immersed in the liquor and allow the latter to drain off while rising therefrom, and means for discharging the finished material from the containers, combined with an intermittent gear box composed of a driving and a driven shaft, a clutch intermediate thereof, a weighted hinged arm adapted to open the clutch a cam rotated by gearing from the driving shaft, and adapted to raise the weighted end of said arm through the medium of a lever, a spring for closing the clutch, and a radial arm (rigid with the weighted arm) connected with a crank lever and brake band for automatically putting on and releasing the brake on the driven part of the clutch.

10. Apparatus for coating or impregnating road stone or other material, comprising a hopper into which the dried and heated material is fed, an endless series of perforated containers, means for transferring the material thereto from the hopper, a tank containing tar or other liquor into which the series of containers dips, means for causing the series to travel and the containers to be successively and completely immersed in the liquor and allow the latter to drain off while rising therefrom, and means for discharging the finished material from the containers, combined with an intermittent gear box composed of a driving and a driven shaft, a clutch intermediate thereof, a weighted hinged arm adapted to open the clutch, a cam rotated by gearing from the driving shaft, and adapted to raise the weighted end of said arm through the medium of a lever, a spring for closing the clutch, and a radial arm (rigid with the weighted arm) connected with the crank lever and brake band for automatically putting on and releasing the brake on the driven part of the clutch, also a cam connected with the driven portion of the apparatus, a lever worked by said cam, and a rod connecting said lever to the weight raising mechanism so as to afford definitely timed continued support to the weighted lever and thereby co-ordinate the timing of the driven with the driving shaft.

JOHN STUART LANCASTER.